United States Patent
Heller (10) Patent No.: US 6,947,400 B2
(45) Date of Patent: Sep. 20, 2005

(54) ACHIEVING PPP MOBILITY VIA THE MOBILE IP INFRASTRUCTURE

(75) Inventor: Howard Andrew Heller, Indialantic, FL (US)

(73) Assignee: IPR Licensing, Inc., Wilmington, DE (US)

(*) Notice: Subject to any disclaimer, the term of this patent is extended or adjusted under 35 U.S.C. 154(b) by 790 days.

(21) Appl. No.: 09/773,364

(22) Filed: Jan. 31, 2001

(65) Prior Publication Data

US 2002/0101857 A1 Aug. 1, 2002

(51) Int. Cl.[7] .................................................. H04Q 7/00
(52) U.S. Cl. ........................ 370/331; 370/401; 370/338; 370/475
(58) Field of Search ................................. 370/328, 329, 370/331, 338, 401, 475, 466, 469

(56) References Cited

U.S. PATENT DOCUMENTS

| | | | |
|---|---|---|---|
| 6,061,650 A | | 5/2000 | Malkin et al. |
| 6,094,437 A | * | 7/2000 | Loehndorf et al. ......... 370/420 |
| 6,118,785 A | * | 9/2000 | Araujo et al. ............... 370/401 |
| 6,366,561 B1 | * | 4/2002 | Bender ........................ 370/238 |
| 6,452,920 B1 | * | 9/2002 | Comstock ................... 370/349 |
| 6,496,491 B2 | * | 12/2002 | Chuah et al. ............... 370/331 |
| 6,522,880 B1 | * | 2/2003 | Verma et al. ............... 455/436 |

OTHER PUBLICATIONS

W. Townsley et al., "Layer Two Tunneling Protocol L2TP", Network Working Group, RFC 2661, Aug. 1999, pp. 1–80.*
C. Perkins, "IP Mobility Support", Network Working Group, RFC 2002, Oct. 1996, pp. 1–79.*

* cited by examiner

*Primary Examiner*—Ricky Ngo
*Assistant Examiner*—Richard Chang
(74) *Attorney, Agent, or Firm*—Hamilton, Brook, Smith & Reynolds, P.C.

(57) ABSTRACT

A method and system is provided for transmitting information from a mobile computer to a server utilizing point-to-point protocol (PPP). The system enables a PPP session to be maintained between a mobile user device and a PPP termination device. A Mobile IP address is assigned to customer premise equipment (CPE) associated with the user device, e.g., a PC. The CPE includes a Mobile IP Mobile Node and L2TP access concentrator (LAC). The Mobile IP address is registered with a Home Agent. The PC initiates a PPP session to the LAC, which initiates an L2TP session to an L2TP Network Server (LNS) via a tunnel between the Home Agent and a Foreign Agent. The Mobile IP Mobile Node registers with the Home Agent each time it detects a new base station. Thus, the Home Agent is informed of the new location to forward IP packets for the mobile computer.

39 Claims, 5 Drawing Sheets

ACHIEVING PPP MOBILITY VIA THE MOBILE IP INFRASTRUCTURE

BACKGROUND OF THE INVENTION

1. Field of the Invention

The present invention relates to mobile communications and, more particularly, to achieving point-to-point protocol (PPP) mobility utilizing a Mobile Internet Protocol (IP) infrastructure.

2. Description of the Related Art

In computer-related networking or telecommunications, the point-to-point protocol is used for communicating information between a source and a destination. PPP is widely used for transmitting Transmission Control Protocol/Internet protocol (TCP/IP) packets over dial-up telephone connections, such as between a general purpose computer and an Internet Service Provider (ISP). TCP/IP is a set of protocols developed by the United States Department of Defense for communications over interconnected, sometimes dissimilar, networks and has become the de facto standard for data communications over various networks, including the Internet. The point-to-point protocol (PPP) provides a standard methodology for transporting multi-protocol datagrams of information over point-to-point links. PPP comprises three main components: (1) a methodology for encapsulating multi-protocol datagrams, (2) a link control protocol (LCP) for establishing, configuring and testing the data link connection, and (3) a family of network control protocols (NCPs) for establishing and configuring different network-layer protocols.

An end-user sets up a PPP session between the source, e.g., a general purpose computer or telecommunication device, and a destination (which can also be a general purpose computer or telecommunication device) for transmitting data or information thereto. In a PPP session, once the initial negotiation phases are successfully completed, a session identifier is associated with the connection, thereby identifying the PPP session. Typically, a single PPP connection exists between an end user's computer and the destination, e.g., an Internet service provider (ISP) or another computer connected to the Internet. The PPP session is closed when the end-user of the network system completes the data or information transfer.

A PPP (point-to-point protocol) packet or frame consists of the user data and any headers of other protocols being encapsulated by the PPP. The frame is also provided with a PPP header. The PPP header contains the information necessary to identify and maintain an associated PPP session.

Encapsulation in PPP treats a collection of structured information as a whole without affecting or taking notice of its internal structure. Thus, a message or packet constructed according to one protocol (such as a TCP/IP packet) may be taken with its formatting data as an undifferentiated stream of bits that is then broken up and packaged according to the higher level point-to-point protocol to be sent over a particular network.

Figure 1:
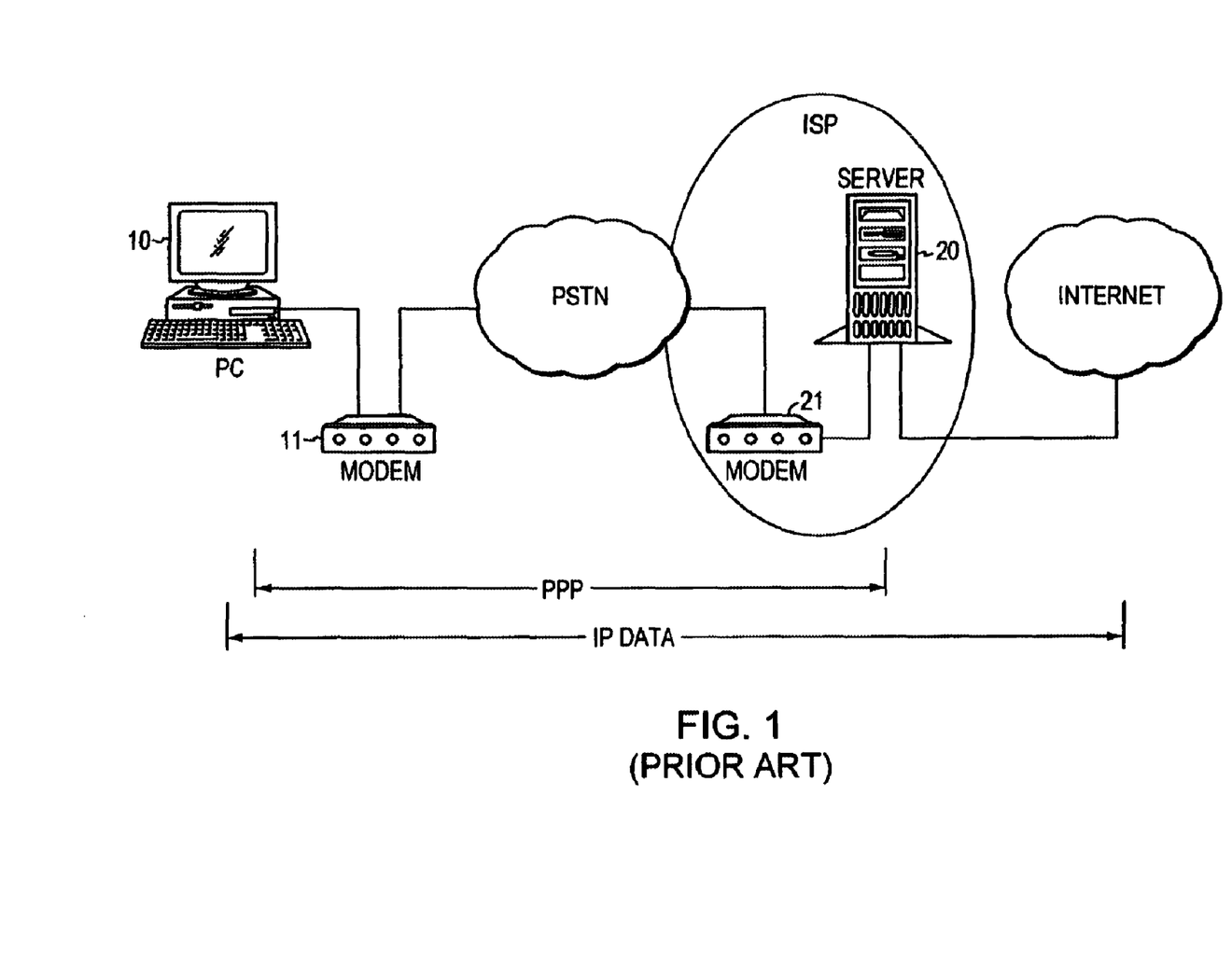
FIG. 1 is a diagram generally illustrating an exemplary prior art point-to-point communication network over the PSTN.

FIG. 1 is a diagram that generally illustrates an exemplary point-to-point communication network over the Public Switched Telephone Network (PSTN). The PSTN is the international telephone system based on copper wires carrying analog voice data. An end-user at his or her personal computer (PC 10), which is the source, commands a software program at PC 10, e.g., MICROSOFT DIAL-UP NETWORKING™, to utilize a modem 11 to connect PC 10 to the ISP's modem server 20 via the PSTN and the ISP's modem 21. Upon connection, a PPP session is established and the user data, in the form of IP packets encapsulated in accordance with PPP, are transmitted to the ISP's modem 21 and its server 20. The server 20 may be the final destination and it may use the information. Alternatively, server 20 may forward the data to its final destination (e.g., a computer at a designated IP address on the Internet).

Layer 2 Tunneling Protocol (L2TP) was developed to enable a PPP session to be established over the Internet, instead of strictly over the PSTN. An L2TP system requires an L2TP access concentrator (LAC), which is a device attached to a switched network system, e.g., the PSTN or the integrated services digital network (ISDN) or co-located with a PPP end system capable of handling the L2TP. The LAC is the initiator of incoming calls to a network and the receiver of outgoing calls therefrom. It encapsulates the PPP data packets.

The L2TP system also requires a L2TP network server (LNS) which unencapsulates the packets, revealing the original PPP frames. An LNS handles the server side of the L2TP connection by acting as the receiver of L2TP tunnel requests from the LAC and terminating the PPP sessions from the end user. The LNS is capable of PPP session termination.

A tunnel is a technology that enables one network to send its data over another network's connections. Tunneling works by encapsulating a network protocol within packets carried by the second network. For example, L2TP technology enables the use of the Internet to extend a PPP link to a point or entity that is not on a directly connected network. This is accomplished by embedding its own network protocol within the TCP/IP packets carried by the Internet.

Figure 2:
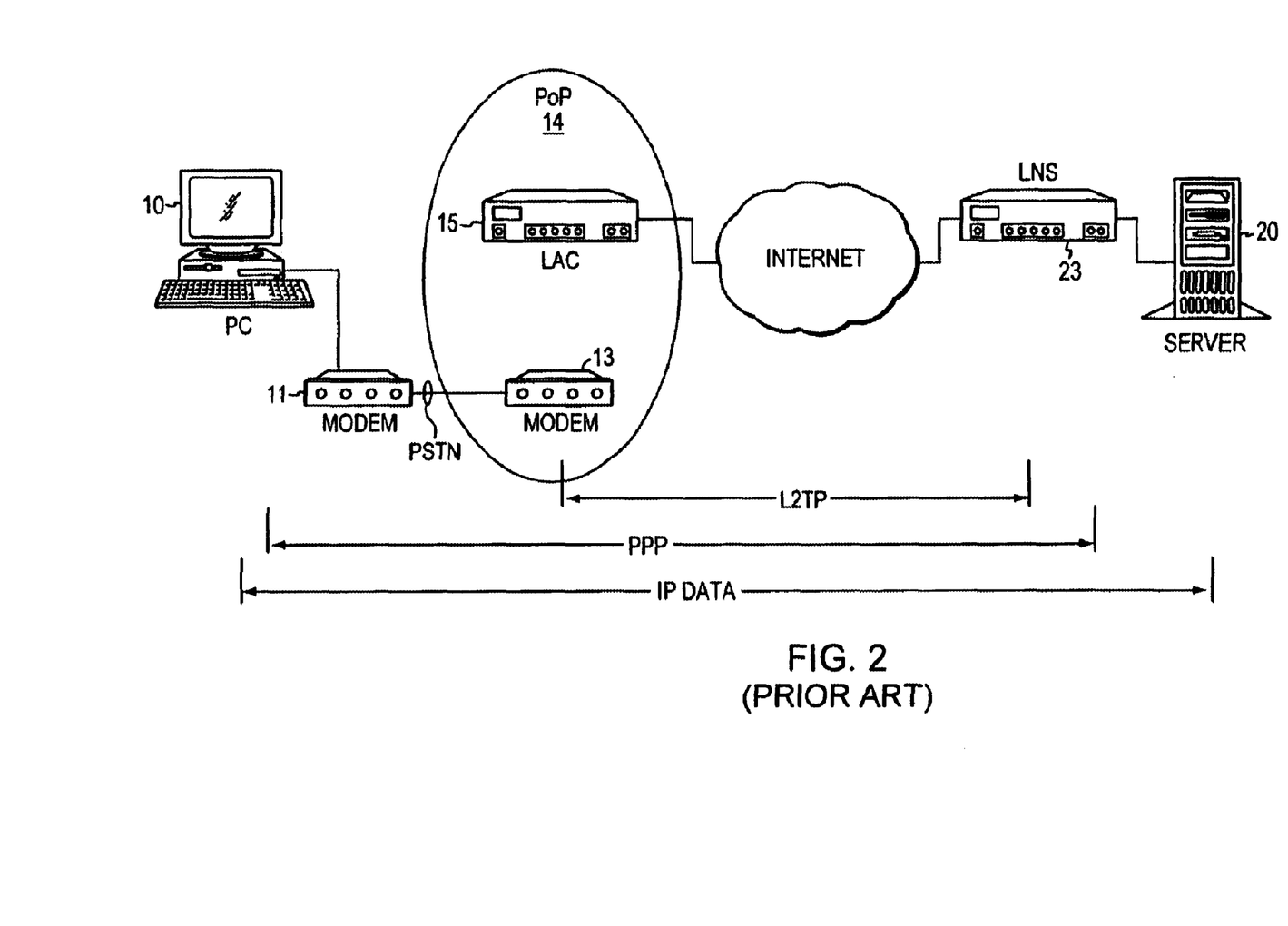
FIG. 2 is a diagram illustrating a prior art point-to-point communication network using the layer 2 tunneling protocol (L2TP) to tunnel a PPP session over the Internet.

FIG. 2 illustrates a way of expanding the use of PPP across the Internet, so that it does not rely exclusively on transmission by way of the PSTN. As shown in FIG. 2, PC 10 is caused to dial over the PSTN into a modem 13 at a local Point of Presence (PoP) 14, which is a device accessible with a local phone call by the end-user and which is connected to a data network (e.g. the Internet). PC 10 then runs PPP to establish a connection to the PoP 14. At this point, an L2TP Access Concentrator (LAC) 15 located within the PoP encapsulates the PPP frames into IP packets according to the L2TP protocol and transmits them over the Internet to the L2TP Network Server (LNS) 23 on the destination network.

The LNS 23 unencapsulates the L2TP packets which reveals the PPP frames. Acting as a PPP termination point, the LNS unencapsulates the PPP frames which reveals the original IP packets. It then forwards the data to its intended destination, e.g. server 20. Unencapsulation is essentially the stripping off of the outer header of a PPP packet, thereby revealing the content of the rest of the packet. This approach enables an end-user of the network system to make a local telephone call to connect to a destination that could be very far away, and which is more easily reached over the Internet.

Figure 3:
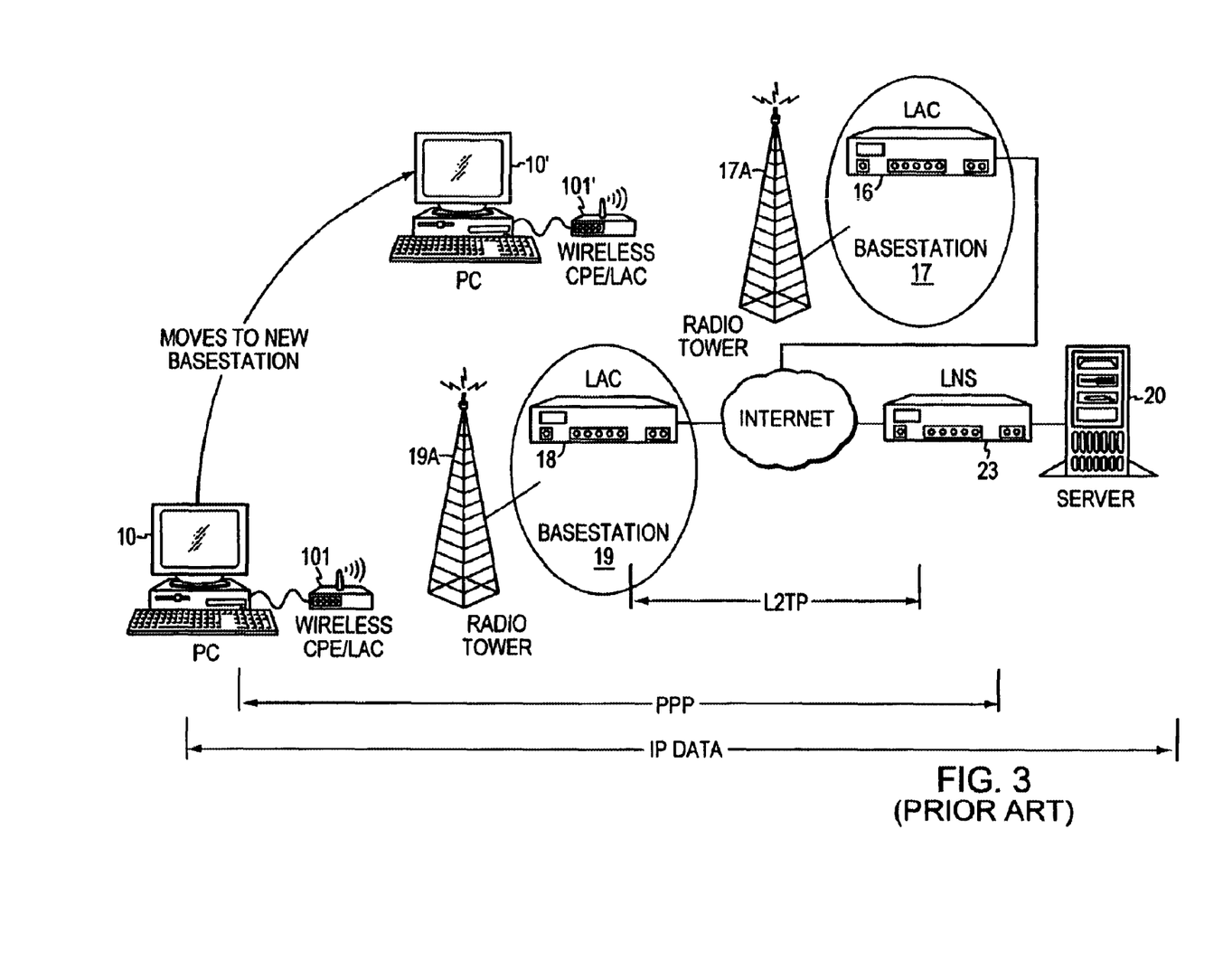
FIG. 3 is a diagram illustrating a prior art point-to-point communication network that places the L2TP access concentrator (LAC) at a base station of a wireless system.

FIG. 3 is a diagram illustrating a wireless communication network that replaces the modem 11 (described in conjunction with FIG. 2) with wireless customer premises equipment (CPE) that includes a L2TP Access Concentrator (CPE/LAC) 101, and places an L2TP Access Concentrator (LAC) 16, 18 at each of the base stations 17, 19 in the wireless system. Customer premise equipment is typically the equipment located at the customer's site which denotes the demarcation point between the customer (or end user) and the service provider, e.g., a T1 line, wireless modem, radio, cable modem, digital subscriber line (DSL) or asymmetric digital subscriber line (ADSL) modems.

For example, the end-user initiates a PPP session from PC 10 to the LAC 18 at base station 19 via the radio tower 19A. LAC 18 creates an L2TP tunnel over the Internet to LNS 23. All PPP frames sent from PC 10 to LAC 18 are encapsulated in L2TP packets and sent to the LNS 23, which unencapsulates the L2TP packets and reveals the PPP frames. The LNS 23 also terminates the PPP connection, revealing the original IP packets and forwards them to their intended destination, i.e. server 20.

As PC 10 moves from the transmitting range of the base station 19 to that of the base station, 17 the new base station 17 has no knowledge of the previous PPP connection to the LNS 23. LAC 16 at the base station 17, with a different IP address, cannot take over an existing L2TP/PPP session for transmitting the information. In order for the base station 17 to service the mobile end-user as PC 10 moves to become PC 10' (and CPE/LAC 101 becomes CPE/LAC 101') in the transmitting range of base station 17, a new PPP session must be initiated by the end-user to LAC 16 associated with the base station 17 via the radio tower 17A.

In each of the above approaches, if the end-user moves from one location to another, the end-user must disconnect from the Internet service provider and re-establish a new PPP session from the new location. This puts the end-user at a disadvantage, as repeated reconnection can be cumbersome and economically inefficient to execute. In particular, if the end-user is mobile and a reconnection is required, the transmission of information is interrupted which is not cost effective and, furthermore, may lead to loss of important information.

Therefore, there is a general need in the art for an improved method and system for communicating information between a source and a destination using PPP. In particular, there is a need in the art for a method and system for communicating PPP packets between a source and a destination without the need for reconnection if the source is mobile.

SUMMARY OF THE INVENTION

The invention provides a method and system for transmitting PPP packets over an infrastructure based on Mobile IP. According to a particular embodiment of the invention, a Mobile IP address is assigned to customer premise equipment (CPE) that includes L2TP Access Concentrator (LAC) functionality and is associated with the computer of the end-user. The Mobile IP address is then registered with a Mobile IP Home Agent associated with the ISP or other address assignment authority. The Mobile IP registration process informs the Mobile IP Home Agent as to which Mobile IP Foreign Agent to forward packets that are destined for the Mobile IP address (i.e. CPE/LAC). Once registered, all data destined to the CPE/LAC will be tunneled from the Home Agent to the current Foreign Agent. In the reverse direction, data can be sent directly from PC 10 via CPE/LAC 101 and the wireless system over the Internet to its destination. Alternatively, it can be sent in a Mobile IP reverse tunnel from the current Foreign Agent to the Home Agent.

In the case where the mobile user is to use PPP to connect to their ISP, the PPP session is established from the PC of the end-user to the CPE of the end-user, which includes the LAC. The LAC functionality in the CPE will tunnel the PPP session to the LNS utilizing L2TP, where the PPP session is terminated. Since the CPE utilizes a Mobile IP address and implements the Mobile IP Mobile Node functionality, data destined for the CPE, including all of the L2TP packets, are forwarded to any location to which the end-user happens to move. The PPP session being carried through the L2TP tunnel is unaffected by the fact that the end-user and CPE device are being moved. Therefore, an end-user can establish a single PPP session to their ISP and will not need to disconnect and reconnect after moving to a new location.

BRIEF DESCRIPTION OF THE DRAWINGS

The foregoing and other advantages and features of the invention will become more apparent from the detailed description of the preferred embodiments of the invention given below with reference to the accompanying drawings, not necessarily drawn to scale, in which.

DETAILED DESCRIPTION OF THE PREFERRED EMBODIMENTS

Figure 4:
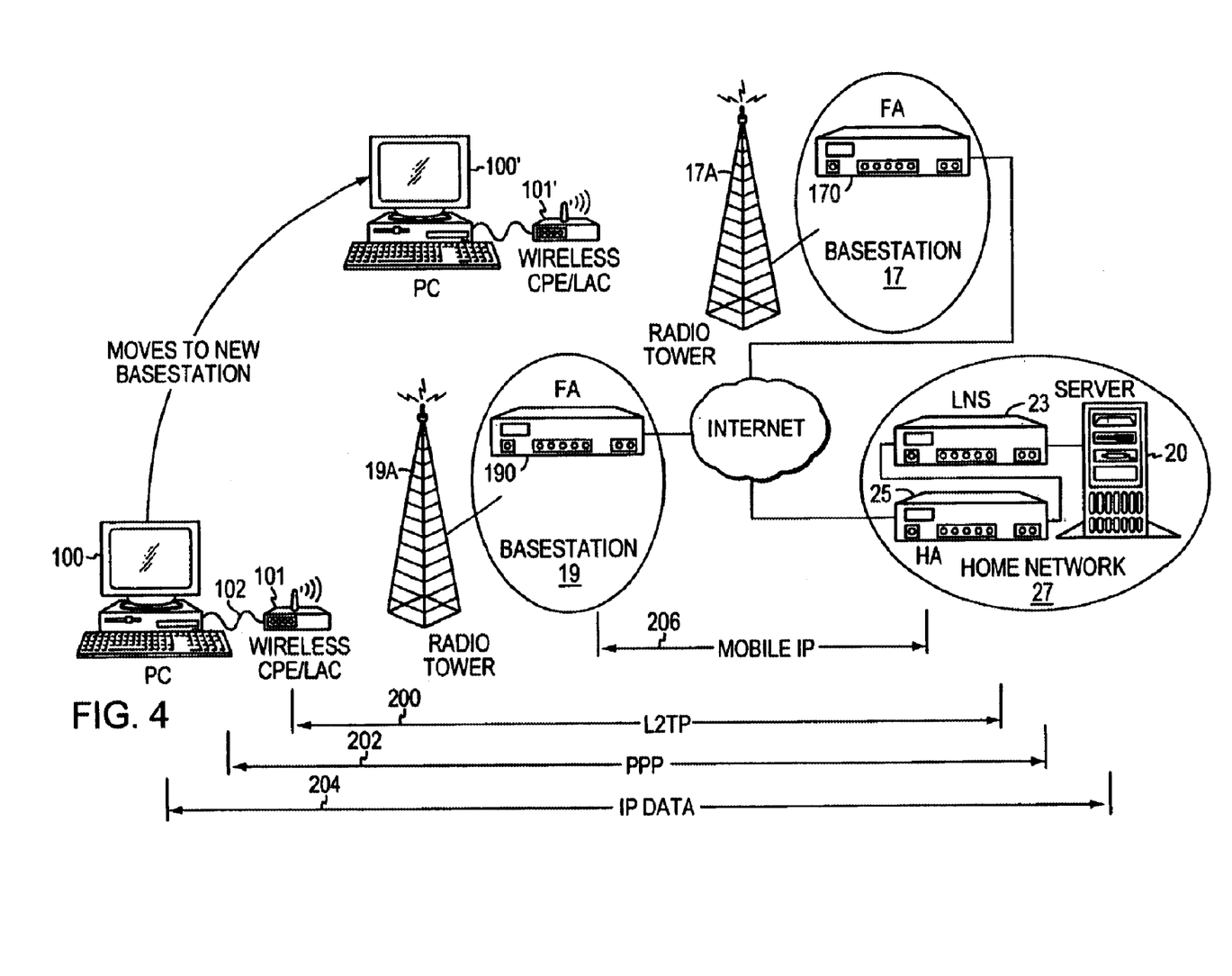
FIG. 4 is a diagram illustrating a point-to-point communication network according to one embodiment of the present invention, which places an L2TP access concentrator (LAC) within a wireless customer premise equipment (CPE) device at the location of an end-user, thus supporting mobility via Mobile IP.

FIG. 4 illustrates an exemplary wireless network system according to the invention. PC 100 of the end-user is connected to a CPE/LAC device 101 which can serve as a Mobile IP Mobile Node and also as a LAC. Mobile IP is a methodology that allows transparent routing of IP (Internet protocol) datagrams to mobile nodes over the Internet. Each mobile node is identified by its home address, regardless of its current point of attachment or connection to the Internet. In Mobile IP, a mobile node is a host or router that changes its points of attachment or connection from one network or subnetwork to another. A mobile node may change its location without changing its IP address. Thus, the mobile node may continue to communicate with other Internet nodes at any location using its (constant) IP address, assuming link-layer connectivity to a point of attachment or connection is available.

The base stations 17 and 19 include a Foreign Agent (FA) 170 and 190, respectively. In Mobile IP, a foreign agent is a router on a mobile node's visited network that provides routing services to the mobile node to which it is registered. The foreign agent delivers datagrams to the mobile node that was tunneled by the mobile node's home agent. For datagrams sent by a mobile node, the foreign agent can serve as a default router for registered mobile nodes, and provide reverse tunneling if requested.

The Home Network 27, which could be an ISP or some other address assigning authority, includes a Mobile IP Home Agent (HA) 25 and L2TP network server (LNS) 23. In Mobile IP, a home agent is a router on a mobile node's home network that tunnels datagrams to the mobile node when it is away from the home location, and maintains current location information for the mobile node. It is not mandatory that these two devices (HA 25 and LNS 23) be located at the same location. The server 20 is what the mobile user is attempting to access, although in other embodiments of the invention, the end user may be attempting to access a server that is located elsewhere on the Internet.

CPE/LAC 101 is assigned a Mobile IP address and is responsible for registering with the Mobile IP Home Agent (HA 25) at the home network 27 of the ISP. CPE/LAC 101 is a user communication device that connects the end user's computer to a wireless network. In this particular embodiment, the CPE/LAC 101 includes not only a wireless communication device, but also a LAC and Mobile IP Mobile Node capability. The Mobile Node capability of CPE/LAC 101 ensures that, as the end-user moves between base stations, the same Mobile IP address is maintained. Although this particular embodiment shows the LAC and the Mobile IP Mobile Node capability within the CPE as a separate unit, they can also be embedded, either together or in part, in the end user device, e.g., a general purpose computer, personal computer (PC), Macintosh, Unix, personal digital assistant (PDA) or mobile telephone.

The end-user initiates a PPP session with the CPE/LAC 101 using PC 100. In a particular embodiment of the invention point-to-point protocol over Ethernet (PPPoE) is utilized to transport the PPP session over an Ethernet local area network (LAN) 102 to CPE/LAC 101. PPPoE is a protocol that enables the building of PPP sessions and encapsulating PPP packets over an Ethernet network. Ethernet is a widely used local area network (LAN) protocol.

The LAC functionality at CPE/LAC 101 tunnels the PPP session (at protocol level 200) to the LNS 23 using L2TP, where both the L2TP session and PPP session are terminated. As the LAC functionality resides in the same CPE/LAC 101 whose Mobile IP address does not change, the movement of the L2TP session, and hence the PPP session is transparent to both the PC 100 and the LNS 23. That is, LNS 23 detects the same L2TP session and PPP session no matter where CPE/LAC 101 is located, i.e. if PC 100 and CPE/LAC 101 both moved to the location indicated by PC 100' and CPE/LAC 101', respectively, the PC 100 will not lose its PPP session and will not have to reconnect each time PC 100 is moved to new location.

When the mobile end-user at PC 100 moves from the transmitting range of the base station 19 to that of the base station 17, the CPE/LAC 101 detects the new base station 17 and re-registers with the Mobile IP Home Agent HA 25. In doing so, it informs the Home Agent 25 of its new point of attachment, i.e., its new Foreign Agent FA 170. HA 25 acknowledges the re-registration and updates its files to reflect the new location of the end-user in the transmitting range of the base station 17. Once the new registration is complete, HA 25 forwards all IP packets destined for CPE/LAC 101 to the new FA 170 instead of the previous FA 190. These IP packets include the L2TP session and any PPP sessions that were being transported within it.

The following steps are performed according to the method of the invention. A PPP session is initiated from PC 100 of the end-user to the CPE/LAC 101. The LAC determines the termination point of the PPP session and establishes an L2TP tunnel to the destination LNS 23. Internet traffic addressed to PC 100 of the end-user, located near base station 19, is routed to the LNS 23 in the home network 27 (ISP) where the address is defined. The LNS 23 encapsulates the IP packet in a PPP frame, and then in an L2TP packet, where it is sent over the Internet to the LAC 101. In particular, since the IP address of the LAC 101 is a Mobile IP address, the packet is converted into a Mobile IP packet and is forwarded to the associated Foreign Agent 190 at the base station 19. The Foreign Agent 190 unencapsulates the Mobile IP packet, reveals the L2TP packet and forwards it wirelessly via tower 19A to the CPE/LAC 101. The LAC 101 unencapsulates the L2TP packet, revealing the PPP frame, which is forwarded via LAN 102 to PC 100 of the end-user.

In the reverse direction, data at protocol level 204 is sent by the end-user at PC 100 to the server 20. This data is transmitted from the end-user PC 100 to the CPE/LAC 101 as a PPP frame (protocol level 202). In a particular embodiment, this utilizes PPPoE (point-to-point protocol over Ethernet) to transmit the PPP frame to the CPE/LAC 101 over an Ethernet LAN 102. The LAC 101 encapsulates the PPP frame into an L2TP packet (protocol level 200) and sends it over the wireless link to the Foreign Agent 190 in base station 19. The Foreign Agent 190 then sends the L2TP packet directly over the Internet to the destination LNS 23 or, if using Mobile IP reverse tunnels, the L2TP packet is tunneled from the Foreign Agent 190 in the base station 19 to the Home Agent 25 using Mobile IP. In Mobile IP (protocol level 206), a reverse tunnel is used to access the destination network by way of the Mobile IP home network of the end user. This is accomplished by tunneling the data or information from the end user at a remote location to the home network of the end user. The home network then forwards the data or information to the destination. This is in contrast to the end user simply sending the data or information directly to the destination.

Assuming the use of Mobile IP reverse tunnels, the Home Agent 25 unencapsulates the Mobile IP packet, revealing the L2TP packet, which is sent to the LNS 23. The LNS unencapsulates the L2TP packet, revealing the PPP frame. The LNS 23, acting as the PPP termination point, strips off the PPP header, reveals the original IP packet containing the user data and forwards it to its ultimate destination, server 20.

If the end-user is mobile and moves into the range of a new base station 17, the CPE/LAC 101 detects the new base station and, acting as a Mobile IP Mobile Node, re-registers with the Mobile IP Home Agent 25. This re-registration process informs the Home Agent 25 of the mobile end-users new point of attachment via a new Foreign Agent 170 associated with the new base station 17. The registration of the Mobile Node (CPE/LAC 101') via the new Foreign Agent 170 is acknowledged, and all subsequent IP packets transmitted from the Home Agent 25 to PC 100 of the end-user are forwarded to the new Foreign Agent 170 associated with the new base station 17. This process is repeated whenever the mobile user moves into range of a new base station.

Since there is an overlap of the area covered by tower 19A with the area covered by tower 17A, the CPE/LAC 100 is still communicating with the base station 19 while it is registering with base station 17. The decision to do this and the related operations are similar to the handoff in mobile voice communications. Thus, there is no loss of data during a transition.

In accordance with the present invention, the Mobile IP provides a method of forwarding IP packets to an end-user's point of attachment no matter where the end-user is located.

If a LAC moves with the end-user instead of being located at a fixed point in the network, and acts as a Mobile IP Mobile Node, then all L2TP packets sent to the LAC are forwarded to the LAC's new location after each Mobile IP registration. The end-user's PC connected to this LAC, keeps a single, continuous PPP session connected even though the user moves from one location to another.

Figure 5:
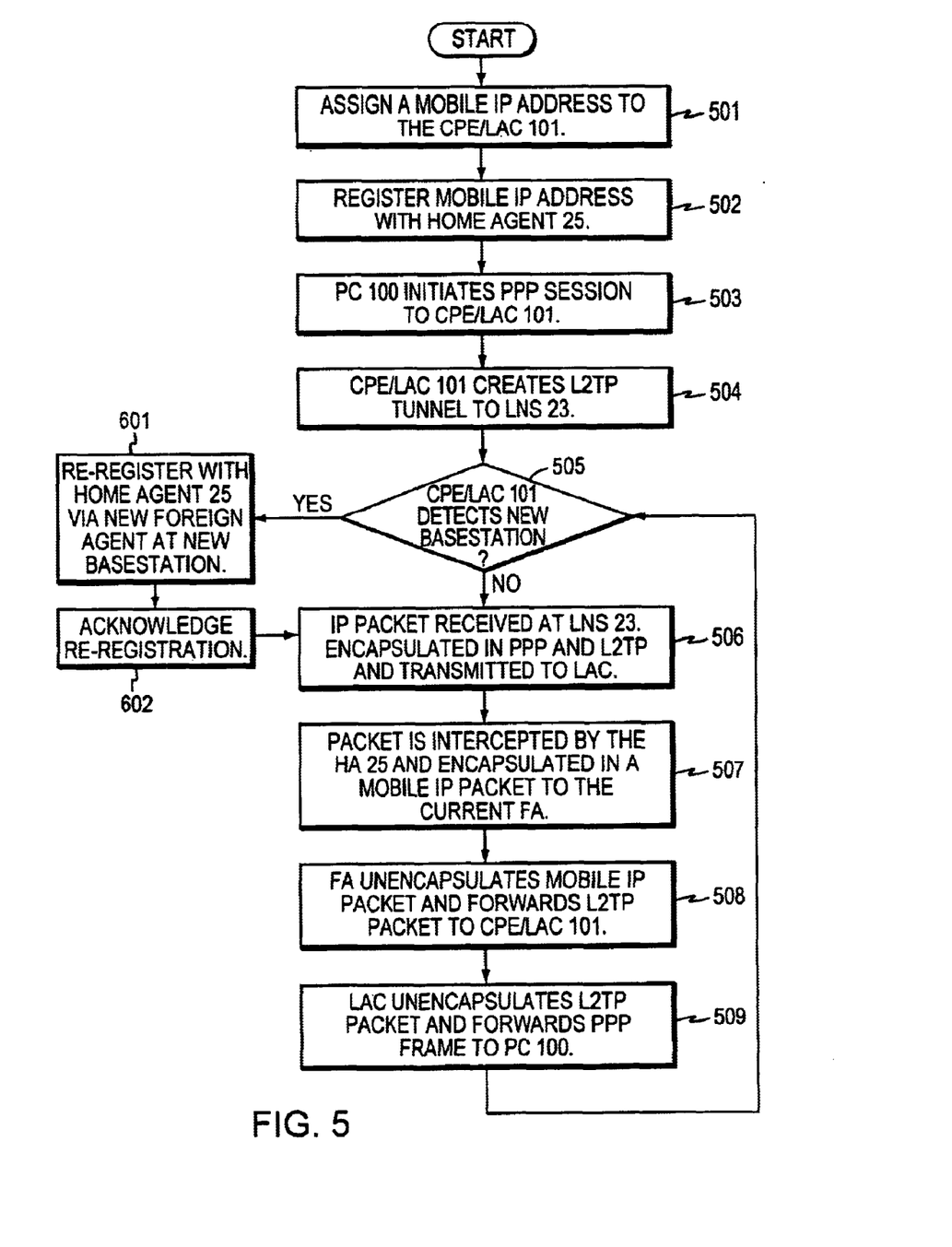
FIG. 5 is a flow diagram illustrating a specific embodiment of the method according to the invention of FIG. 4 for transmitting data or information from a computer to a server.

FIG. 5 is a flow chart that illustrates a specific embodiment of the method according to the invention for transmitting information from a computer to a server over a PPP session in a mobile environment. This particular embodiment is described herein in conjunction with the network shown in FIG. 4.

In step 501, a Mobile IP address is assigned to CPE/LAC 101, which includes Mobile IP Mobile Node functionality and is associated with PC 100. The Mobile IP address is then registered with the Home Agent HA 25 associated with the home network 27 (step 502). A PPP session is initiated to the CPE/LAC 101 (step 503) from PC 100. Using the information extracted from the initiation of the PPP session, the CPE/LAC 101 creates an L2TP tunnel to the LNS 23 (step 504). Packets received at LNS 23 for the end-user at PC 100 are encapsulated in a PPP frame and then in an L2TP packet, which are then transmitted to the LAC 101 (step 506). The L2TP packet, since it is addressed to a Mobile IP address, is intercepted by the Home Agent 25, encapsulated in a Mobile IP packet, and transmitted over the Internet to the current Foreign Agent 190 (step 507). The Foreign Agent unencapsulates the Mobile IP packet and forwards the remaining L2TP packet to the CPE/LAC 101 (step 508). The LAC unencapsulates the L2TP packet and forwards the remaining PPP frame to the PC 100 (step 509).

Should the end-user be mobile and move within range of a new base station, e.g. to the position indicated in PC 100', the CPE/LAC 101'detects the movement (step 505) and reregisters with the Home Agent 25 (step 601). This re-registration process informs the Home Agent 25 of the mobile users new point of attachment via a new Foreign Agent 170 associated with the new base station 17. The registration of the Mobile Node (CPE/LAC 101) via the new Foreign Agent 170 is acknowledged (step 602), and all subsequent IP packets transmitted from the Home Agent 25 to the CPE/LAC 101 are forwarded to the new Foreign Agent 170 associated with the new base station 17. The re-registering and the acknowledging processes (steps 601 and 602) are transparent to the computer and the server.

The PPP session between PC 100 and LNS 23 is unaffected by the movement from one location to another. Only the Home Agent 25, the visited Foreign Agents (190 and 170) and the Mobile IP Mobile Node capability within the CPE/LAC 101 are aware of the change in end-user location. Since the mobility of the PC 100 is transparent to the two end-points of the PPP session (the PC 100 and the LNS 23), the PPP session is never disconnected.

The above examples describe this PPP mobility technique according to the invention as being used in a wireless environment. This is due to the mobile nature of the wireless environment. This technique could also be used in a fixed network environment, where the end-user unplugs his or her PC from one network and moves to another network, although the benefits of maintaining continuous connectivity are much more pronounced in a wireless environment.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

What is claimed is:

1. A method for transmitting information from a computer to a server comprising the steps of:
   (a) assigning a Mobile Internet protocol (IP) address to customer premise equipment (CPE) associated with the computer;
   (b) registering the Mobile IP address with a Mobile IP home agent associated with a home network for the assigned Mobile IP address;
   (c) initiating a point-to-point (PPP) session from the computer to a L2TP access concentrator (LAC) associated with the CPE;
   (d) encapsulating IP data from the computer into PPP frames and sending it to the LAC;
   (e) encapsulating the PPP frames into L2TP packets at the LAC;
   (f) directing the L2TP packets to a Mobile foreign agent associated with a mobile base station via mobile communications;
   (g) further encapsulating the L2TP packets at the Mobile IP foreign agent into Mobile IP packets;
   (h) transmitting the Mobile IP packets to the Mobile IP home agent associated with a base station;
   (i) unencapsulating the transmitted Mobile IP packets at the Mobile IP home agent into L2TP packets;
   (j) forwarding the L2TP packets to the L2TP network server (LNS) associated with the Mobile home agent;
   (k) unencapsulating the forwarded L2TP packets at the LNS into PPP frames;
   (l) further unencapsulating the PPP frames into IP packets;
   (m) forwarding the IP packets to the server;
   (n) sending IP packets intended for the computer from the server to the LNS where they are encapsulated into PPP frames, further encapsulating the PPP frames into L2TP packets;
   (o) sending the L2TP packets to the Mobile home agent where they are encapsulated as Mobile IP packets;
   (p) directing the Mobile IP packets from the Mobile home agent to the foreign agent associated with the registered CPE of the destination computer;
   (q) unencapsulating the Mobile IP packets at the foreign agent to uncover L2TP packets;
   (r) sending the L2TP packets to the destination CPE and having the LAC associated with the CPE unencapsulate the L2TP packets into PPP frames; and
   (s) sending the PPP frames to the computer.

2. The method of claim 1 wherein movement of the PPP session is transparent to the computer and the server.

3. The method of claim 1 wherein movement of the PPP session is transparent to the LAC and the LNS.

4. The method of claim 1 further comprising the step of:
   (t) determining whether the CPE detects a new base station.

5. The method of claim 4 further comprising the steps of:
   if a new base station is detected in step (s), (u) re-registering with the Mobile IP home agent via a new Mobile IP foreign agent associated with the new base station;

(v) acknowledging the re-registering; and (w) transmitting the L2TP packets from the LNS to the LAC via the Mobile IP home agent to the new Mobile IP foreign agent.

6. The method of claim 5 wherein step (u) further comprises informing the Mobile IP home agent of a new location of the CPE.

7. The method of claim 5 wherein the steps (u) and (v) are transparent to the computer and the server.

8. The method of claim 1 wherein the PPP session utilizes PPPoE (point-to-point protocol over Ethernet) for transporting the PPP frames over an Ethernet network.

9. A system for transmitting information from a computer to a server, the system comprising:

customer premise equipment (CPE) associated with the computer; said CPE having a Mobile Internet protocol (IP) address assigned thereto;

a Mobile IP home agent associated with a home network for the assigned Mobile IP address, wherein the Mobile IP home agent is registered with the Mobile IP address;

a L2TP access concentrator (LAC) associated with the CPE which is capable of establishing a point-to-point protocol (PPP) session from the computer to the L2TP access concentrator (LAC);

an L2TP network server (LNS) associated with the server and being capable of establishing an L2TP (layer 2 tunneling protocol) session between it and the LAC, wherein IP data are encapsulated into PPP frames and then into L2TP packets at the LNS and the L2TP packets are sent to the LAC, wherein the L2TP packets being intercepted by the Mobile IP home agent where they are encapsulated in Mobile IP packets;

a Mobile IP foreign agent associated with a base station wherein the Mobile IP packets are unencapsulated at the Mobile IP foreign agent into L2TP packets and the L2TP packets are forwarded to the LAC via the base station, the L2TP packets forwarded to the LAC being unencapsulated by the LAC into PPP frames and the PPP frames being forwarded by the LAC to the computer.

10. The system of claim 9 wherein movement of the PPP session is transparent to the computer and the server.

11. The system of claim 9 wherein movement of the PPP session is transparent to the LAC and the LNS.

12. The system of claim 9 wherein the CPE detects whether it is within range of a new base station.

13. The system of claim 12 further wherein:

if a new base station is detected, the CPE re-registers with the Mobile IP home agent informing it of a new Mobile IP foreign agent associated with the new base station, and the Mobile IP home agent transmits the L2TP packets from the LNS to the LAC via the new Mobile IP foreign agent.

14. The system of claim 13 wherein the CPE notifies the Mobile IP home agent of a new location of the CPE.

15. The system of claim 13 wherein Mobile IP mobile node functionality is re-registered and acknowledged transparently to the computer and the server.

16. The system of claim 9 wherein the PPP session utilizes PPPoE (point-to-point protocol over Ethernet) for transporting the PPP frames over an Ethernet network between the computer and the CPE.

17. The system of claim 9 wherein the CPE comprises a Mobile IP mobile node functionality and LAC (L2TP access concentrator) functionality.

18. A system for transmitting information from a user device to a server on a computer network, the system comprising:

a user device being coupled to customer premise equipment (CPE) that connects to a base station over a wireless link, the CPE having an assigned Mobile Internet Protocol (IP) address, the CPE including a Mobile IP mobile node and a Layer 2 Tunneling Protocol (L2TP) access concentrator (LAC);

the mobile node of the CPE registering the Mobile IP address of the CPE with a Mobile IP home agent of a home network, the mobile node registering a Mobile IP foreign agent with the home agent each time the CPE connects to a base station so that IP packets destined for the Mobile IP address of the CPE are encapsulated and forwarded to the foreign agent that corresponds to that base station;

the user device being connected to the LAC via a PPP (point-to-point protocol) session for accessing a server on a computer network;

the LAC being connected to an L2TP network server (LNS) on the computer network over a wireless link through an L2TP tunnel; and the user device communicating with the server on the network by transmitting PPP frames containing IP packets destined for the server over the PPP session to the LAC, tunneling the PPP frames from the LAC to the LNS over the wireless link through the L2TP tunnel, terminating the L2TP tunnel and the PPP session at the LNS, and forwarding the IP packets contained in the PPP frames from the LNS to the server on the network.

19. The system of claim 18 wherein the LNS is associated with L2TP tunnels initiated at other LACs and is a termination point of the L2TP tunnels and PPP sessions contained within the L2TP tunnels.

20. The system of claim 18 wherein it is determined when the CPE is within range of a new base station.

21. The system of claim 20 wherein, if it is determined that the CPE is within the range of the new base station, the CPE is re-registered with the Mobile IP home agent via a new Mobile IP foreign agent associated with the new base station.

22. The system of claim 21 wherein the Mobile IP home agent is informed of a new location of the CPE.

23. The system of claim 21 wherein, upon acknowledgment of the re-registered CPE, the Mobile IP home agent forwards the IP packets destined for the Mobile IP address, to the new Mobile IP foreign agent.

24. The system of claim 21 wherein the CPE is re-registered transparently to the computer and the server.

25. The system of claim 18 wherein the CPE comprises a Mobile IP mobile node functionality and LAC (L2TP access concentrator) functionality.

26. The system of claim 18 wherein the CPE is co-located within the user device.

27. The system of claim 18 wherein the CPE is separately located from the user device.

28. The system of claim 18 wherein the user device is selected from a group consisting of a general purpose computer, personal computer (PC), personal digital assistant (PDA), and mobile telephone.

29. The system of claim 18 wherein movement of the PPP session is transparent to the computer and the server.

30. The system of claim 18 wherein movement of the PPP session is transparent to the LAC and the LNS.

31. A method for transmitting information from a computer to a server comprising the steps of:
  (a) registering a Mobile IP address, for customer premise equipment (CPE) associated with the computer, at a Mobile IP home agent associated with a home network for the assigned Mobile IP address;
  (b) initiating a point-to-point protocol (PPP) session from the computer to a L2TP access concentrator (LAC) associated with the CPE;
  (c) initiating layer 2 tunneling protocol (L2TP) session between the LAC and an L2TP network server (LNS) associated with the server;
  (d) encapsulating data from the computer into PPP frames at the computer;
  (e) directing the PPP frame data to the LAC where it is encapsulated as L2TP packets;
  (f) sending the L2TP packets to a foreign agent at a mobile base station,
  (g) encapsulating the L2TP packets at the foreign agent into Mobile IP packets;
  (h) transmitting the Mobile IP packets to the Mobile IP home agent where they are unencapsulated into L2TP packets;
  (i) forwarding the L2TP packets to the LNS;
  (j) unencapsulating the forwarded L2TP packets at the LNS into PPP frames; and
  (k) terminating the PPP session, unencapsulating the PPP frames into IP packets, and forwarding the data from the computer in substep (d) to the server.

32. The method of claim 31 further comprising the steps of:
  (l) sending IP packets intended for the computer from the server to the LNS where they are encapsulated into PPP frames and then into L2TP packets;
  (m) sending the L2TP packets to the Mobile home agent where they are encapsulated as Mobile IP packets;
  (n) directing the Mobile IP packets from the Mobile home agent to the foreign agent associated with registered CPE of the destination computer;
  (o) unencapsulating the Mobile IP packets at the foreign agent to uncover L2TP packets;
  (p) sending the L2TP packets to the destination CPE and having the LAC associated with the CPE unencapsulate the L2TP packets into PPP frames; and
  (q) sending the PPP frames to the computer.

33. The method of claim 31 wherein movement of the PPP session is transparent to the computer and the server.

34. The method of claim 31 wherein movement of the PPP session is transparent to the LAC and the LNS.

35. The method of claim 31 further comprising the step of:
  (r) determining whether the CPE detects a new base station.

36. The method of claim 35 further comprising the steps of:
  if a new base station is detected in step (r),
  (s) re-registering with the Mobile IP home agent via a new Mobile IP foreign agent associated with the new base station;
  (t) acknowledging the re-registering; and
  (u) transmitting the L2TP packets from the LNS to the LAC via the Mobile IP home agent to the new Mobile IP foreign agent.

37. The method of claim 36 wherein step (s) further comprises informing the Mobile IP home agent of a new location of the CPE.

38. The method of claim 36 wherein the steps (s) and (t) are transparent to the computer and the server.

39. The method of claim 31 wherein the PPP session utilizes PPPoE (point-to-point protocol over Ethernet) for transporting the PPP frames over an Ethernet network.

* * * * *